Aug. 6, 1935.　　　　L. M. WOOLSON　　　　2,010,171
INTERNAL COMBUSTION ENGINE
Filed Oct. 28, 1929　　　　2 Sheets-Sheet 1
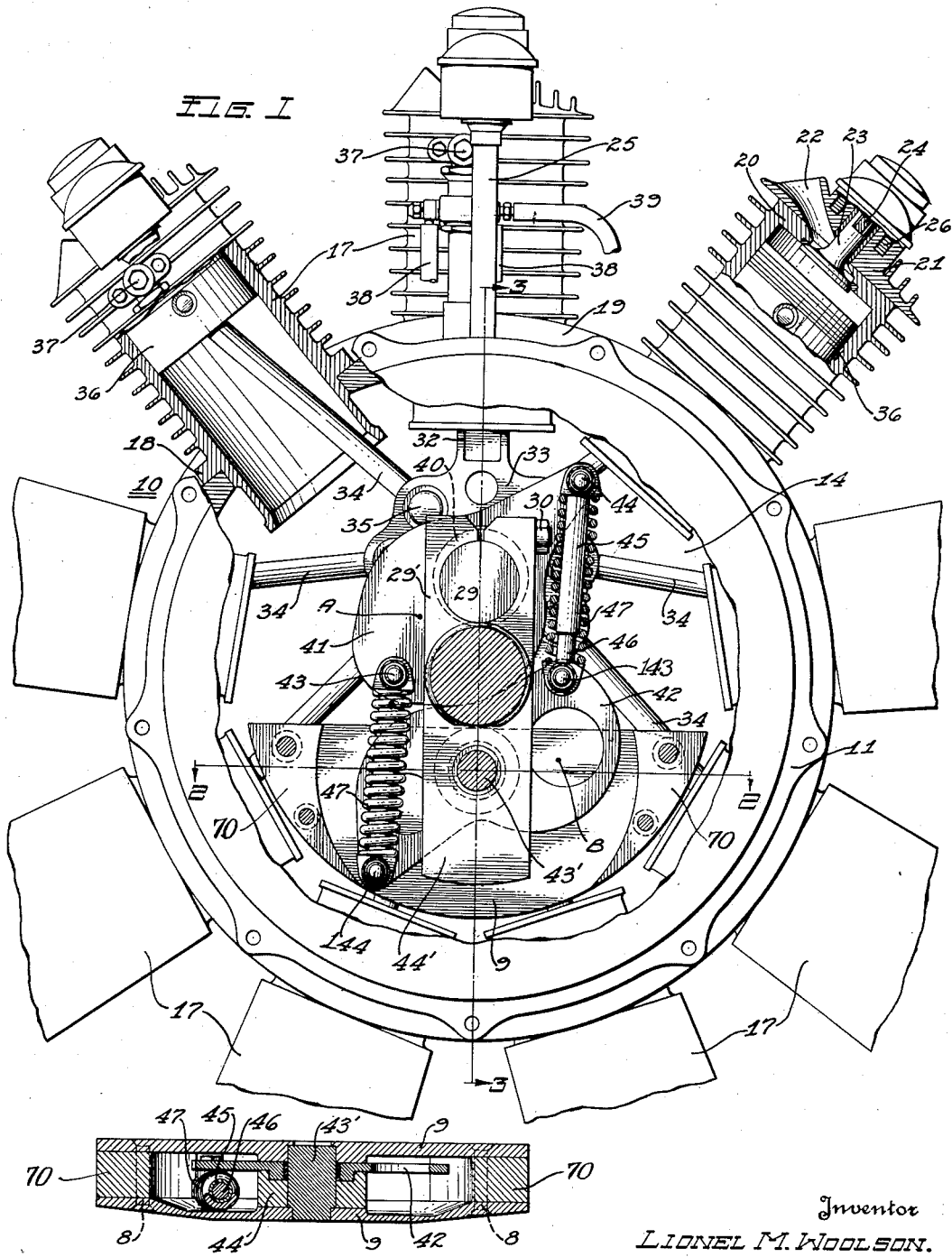
Inventor
LIONEL M. WOOLSON.
By Milton Tibbetts
Attorney

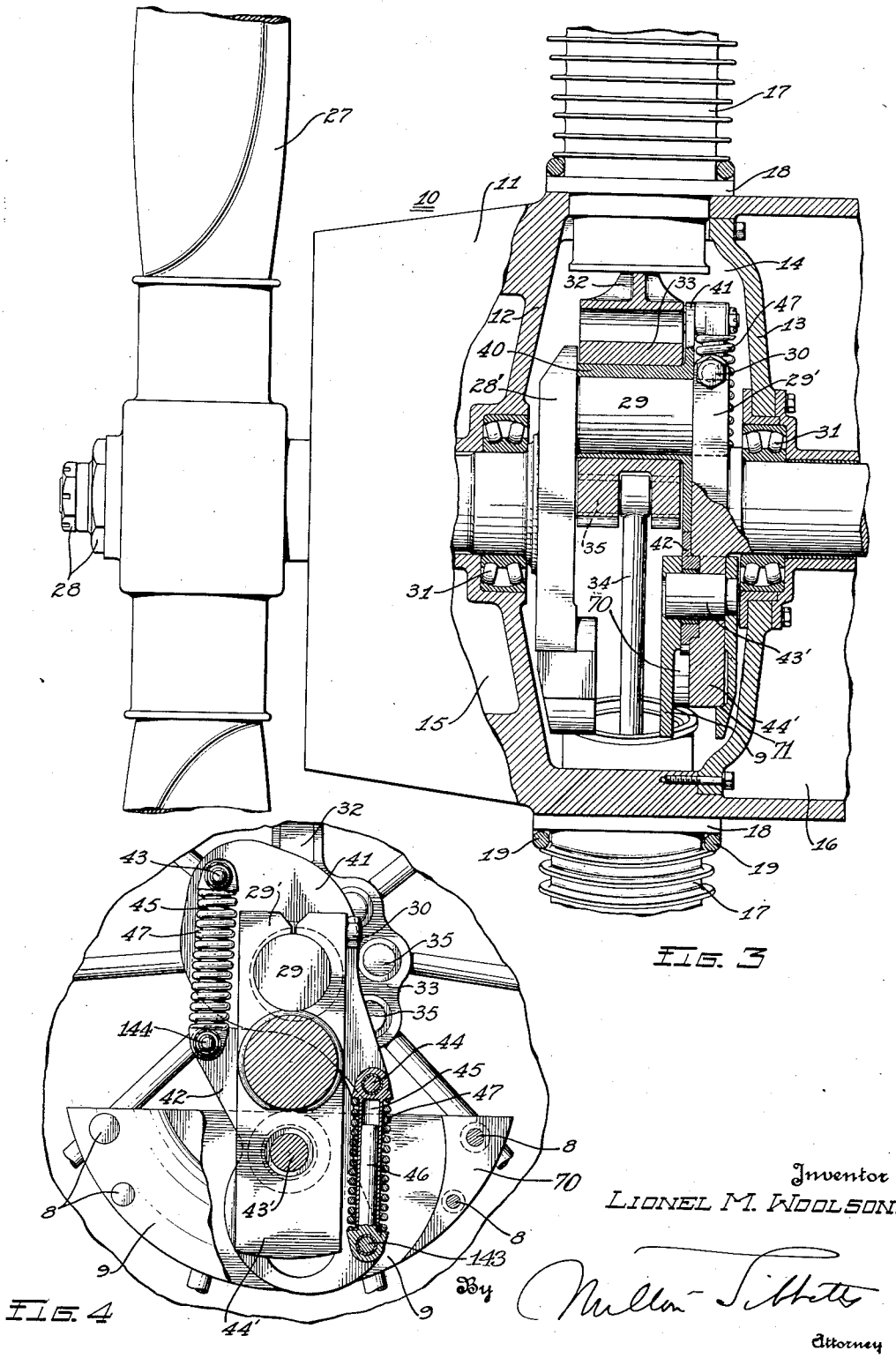

Patented Aug. 6, 1935

2,010,171

UNITED STATES PATENT OFFICE 2,010,171

INTERNAL COMBUSTION ENGINE

Lionel M. Woolson, Detroit, Mich., assignor to Packard Motor Car Company, Detroit, Mich., a corporation of Michigan Application October 28, 1929, Serial No. 402,813

10 Claims. (Cl. 123—48)

This invention relates to internal combustion engines, and more particularly to compression ratio regulating mechanism.

Diesel engines depend upon pressure within the cylinders for the development of temperature which will ignite the fuel charges, and the cold condition of the cylinders together with the high compression makes it necessary for considerable energy to be exercised in order to cause ignition when starting. This condition is ordinarily aggravated when the air charges for the fuel mixture are drawn directly into the cylinders from the exterior thereof. Furthermore, when a Diesel engine is used as the power plant of an airplane, the incoming air is usually of such a temperature that it will chill the cylinders so that firing will cease during idling and, as this frequently happens when gliding, serious danger is caused thereby.

An object of my invention is to automatically increase the compression ratio in an engine inversely to its speed so that when starting or running at low speeds, the engine will operate with a high compression ratio, and when running at a high speed, it will operate with a lower compression ratio.

Another object of my invention is to provide an internal combustion engine with automatic mechanism for regulating the quantity in the air charges drawn into the cylinders inversely with respect to the speed of the engine.

Another object of the invention is to provide a compression ratio regulating mechanism for an internal combustion engine which includes interconnected masses which rotate with and relative to the crankshaft and will automatically cause the compression ratio of the engine to be regulated inversely with the speed above a predetermined R. P. M.

A further object of the invention is to provide a compression ratio regulating mechanism controlled automatically by the speed of the crankshaft and associated compactly therewith.

These and other objects of the invention will appear from the following description taken in connection with the drawings, which form a part of this specification, and in which:

Fig. 1 is an end view of an engine, the crankcase being broken away and parts being in section to show the relation of my invention with the engine, Fig. 2 is a sectional view taken on line 2—2 of Fig. 1 showing the crankshaft and the compression ratio regulating mechanism, Fig. 3 is another sectional view taken on line 3—3 of Fig 1, and Fig. 4 is a fragmentary view corresponding to Fig. 1 and illustrating the compression ratio regulating mechanism in its relation to produce a low compression ratio, the arrangement shown in Fig. 1 producing a high compression ratio.

Referring now to the drawings by characters of reference, 10 designates generally the power plant of an airplane which is preferably in the form of a radial Diesel type of engine. The annular barrel-like crankcase 11 is provided with two spaced partition walls 12 and 13 between which is formed a compartment 14, and on the sides of such compartment are formed the oil reservoir chamber 15 and the compartment 16. Cylinders 17 are arranged to extend radially from the crankcase and are formed with shoulders 18 which bear against the crankcase and are secured thereto by a pair of annular compression bands 19, such compression bands being arranged to absorb all of the explosion loads from the cylinders and transmit the same annularly to the crankcase. The cylinders are each provided with an integral head 20 upon which an auxiliary head 21 is secured, such heads being formed with a single Venturi passage 22 extending therethrough at an angle to the axis of the cylinder and tangential to the inner wall of the cylinder. These passages serve for both the air inlet and the exhaust and communicates with the interior of the cylinders. A valve 23 is associated with the inner end of each of such passages, being opened by a lever 24 actuated by a mechanism which extends through the housing 25 and projects into the compartment 16 where it is operated through mechanism driven from the crankshaft. A plurality of coil springs 26 are associated with each valve mechanism to normally maintain the valve in closed position.

A crankshaft extends axially of the crankcase and projects through the forward end thereof, a propeller 27 being mounted upon the projecting end of such shaft and secured thereon by fastening means 28. The shaft preferably consists of two sections, the forward section having an arm 28' and a crank pin 29 formed integrally while the other section of the shaft includes the arm 29'. The upper end of the arm 29' is bifurcated and is clamped around an end of the crank pin and secured thereto by the bolt 30, so that the two shaft sections can be detached when the bolt 30 is loosened. The crankshaft is carried by the crankcase and suitable bearings such as shown at 31 are provided therefor.

A master rod 32 is provided with a hub 33 which is mounted upon the crank pin 29, and a plurality of connecting rods 34 are secured in a circular relation to the hub 33 by the pins 35. The connecting rods and the master rod extend into the cylinders and are connected to the pistons 36. It will be understood that assembly of the master rod hub on the crank pin is accomplished through endwise movement when the sections of the shaft are separated, the master rod being maintained upon the crank pin between the two arms 28 and 29' when the shaft is assembled.

The engine illustrated is, as before stated, of the radial Diesel type and operates upon a four stroke cycle. The valve operating mechanism is arranged to hold the valves open during the exhaust and the air intake strokes, such valves being closed during the compression and explosion strokes.

The fuel oil charges are introduced separately into the cylinders, the air portion of the charges being drawn through the passages 22 on the suction stroke of the pistons 36 while the fuel portion of the fuel mixture is introduced into the cylinders during the compression of the air charges and prior to top center position of the pistons. Any suitable form of fuel injection mechanism can be employed to introduce the fuel oil into the cylinders, but I prefer that a separate injection device be associated directly with each cylinder and such devices are indicated generally at 37, each of such devices consisting of a nozzle portion which extends through the cylinder wall and a pump portion which is driven by mechanism operated from the crankshaft within the compartment 16. It will be understood that the fuel is injected under high pressure and in an atomized condition by the injection devices so that the fuel will be projected partially across the cylinder and will be mixed with the compressed air charges which are rotating within the cylinders due to the manner in which the passages 22 are positioned and formed. A suitable manifold, as indicated at 38, extends around the cylinders and is connected with each of the fuel devices and a suitable source of supply. Pump mechanism is employed to propel oil through the manifold under a low pressure, and an overflow conduit 39 is associated with the uppermost portion of the manifold for conducting excess fuel back to the source of supply. For a better understanding of the particular type of engine so far described reference may be had to my Patent 1,896,387 issued February 7, 1933.

In order that the compression ratio of the engine can be regulated I provide a bearing sleeve 40 for the hub of the master rod, such bearing sleeve having an eccentric bore through which the crank pin 29 extends. It will be understood that the arm 29' must be detached from the crank pin in order to assemble the bearing sleeve 40 and the master rod upon the crank pin 29. The position of the bearing sleeve upon the crank pin can be adjusted and fixed by mechanism which I will now describe so that the compression ratio is automatically regulated inversely to and by the speed of the crankshaft.

The bearing sleeve 40 is provided with an end cam flange 41 which extends adjacent the forward face of the crank arm 29'. A cam plate 42 is associated to contact peripherally with the cam flange and is pivotally mounted on a pin 43' carried by the end portion 44' of the crank shaft arm 29'. Pins 43 and 44 are fixed to the cam flange on opposite sides of the crank shaft while pins 143 and 144 are fixed to the plate 42 on opposite sides of the pin 43'. A cylindrical housing 45 is pivotally mounted at one end on each of the pins 43 and 44 and a plunger member is pivotally mounted on each of the pins 143 and 144. The plungers telescope into the housings and a coil spring 47 surrounds each housing, one end of each spring bearing against a shoulder adjacent the pivoted end of its housing and the other end of each spring bearing against a shoulder adjacent the pivoted end of its plunger. The plunger and cylinder structures are for the purpose of anchoring the springs with respect to the cam elements.

A counterweight structure is fixed to the crank shaft arm end 44'. This structure includes two outer sections 9 and intermediate spacer sections 70 which are secured together by rivets 8. The crank shaft arm end 44' and the cam plate 42 extend between the outer sections 9, and one of the sections 9 is formed with a shoulder 71 contacting with the end wall of the arm end 44' to fix the counterweight structure with the crank shaft so that it will rotate therewith. The ends of the pin 43' projecting through the cam plate and the crank arm extend into apertures formed in the outer counterweight sections 9.

The flange 41 and the plate 42 are formed with peripheral cam surfaces which are arranged to engage, and they are held in such contacting relation by the pressure of the coil springs 47 acting on the intermediate anchoring structures as hereinafter more fully explained. The contacting peripheral surfaces of the cams are designed to cause parallel motion of the members 41 and 42, to the extent hereinafter described, the contact being maintained by the springs 47 and their associated anchoring means. The distance of the pins 43 and 143 from the crank shaft axis during crank shaft rotation is the same and the distance of the pins 44 and 144 from the crank shaft axis during rotation of the crank shaft is similar. However, the radius of pins 43 and 143 is less than the radius of the pins 44 and 144.

The approximate center of gravity of the cam flange element is indicated at A, while the approximate center of gravity of the cam plate 42 is indicated at B, such centers being located so that they move similarly. Because of this similar movement of the centers of gravity during operation, the cam elements are always put in equilibrium so that they will not cause unbalancing of the engine.

The cam elements are assembled on the crank shaft and associated in the relation shown in Figures 1 and 3. The thickest portion of the wall of the bearing is in position causing the connecting rod hub to rotate a maximum distance from the crank shaft, thereby resulting in maximum piston strokes so that maximum air volumes are drawn into the cylinders and the highest compression ratio is had. The crank shaft rotates in a clockwise direction looking at the rear of the engine, and, during operation, explosion forces tend to turn the bearing 40 clockwise on the crank shaft while centrifugal force tends to turn the cam elements 41 and 42 clockwise on the crank shaft because of the offset relation of their centers of gravity. There is of course some friction force tending to prevent turning of the bearing 40 on the crank shaft, but, in the main, such turning is prevented below a predetermined speed by the forces exerted between the cam elements by the parallel coil springs 47. Until the centrifugal force is sufficient to overcome the spring forces, the cam members will rotate in stationary relation with the crank shaft and, in the present instance, centrifugal force sufficient to overcome the spring force is developed when the crank shaft is turning above a predetermined R. P. M.

When the crank shaft speed becomes such that centrifugal force of the cam elements 41 and 42 overcomes the force exerted therebetween by the springs 47, the cam elements will both turn clockwise on the crank shaft, looking at the rear of the engine, thereby moving the thickest portion of the bearing wall in an arcuate direction, as shown in Figure 4. Such movement of the bearing 40 will change the zone of the connecting rod hub rotation closer to the axis of the crank shaft so that the piston strokes, at both ends, will be shortened thereby reducing the volume of air drawn into the cylinders as well as the compression ratio. The cam elements are held in peripheral contact by the pressure of the parallel springs, and they will rotate to the same degree during outward movement under the action of centrifugal force because of the design of the contacting surfaces as hereinafter explained. Due to the difference in the radius of pins 43 and 143 relative to the radius of pins 44 and 144, the springs 47 will compress when their exerted force is overcome by centrifugal force of the cam elements 41 and 42. Compression of these springs increases their exerted force between the cam elements which returns the elements toward idling position as centrifugal force lessens.

The cam member 41 is not movable relative to the crank shaft pin through centrifugal force developed in itself because of the friction placed thereon by the eccentric bearing through the forces of the connecting rod structure and because of the arrangement of the springs which oppose such rotational movement on the crank shaft pin. The cam member 42 has an offset center of gravity and creates a centrifugal force, when the engine is rotating, tending to rotate it against the cam 41, such centrifugal movement of the member 42 being resisted by the springs. When the centrifugal force of the cam member 42 added to the centrifugal force of the cam member 41 is sufficient to overcome the force of the springs and the frictional resistance to movement of the cam member 41, then the cam members will rotate in the same direction relative to the crank pin. Frictional and spring resistance to rotation are concentrated on the cam member 41 so that, during engine operation, the effect of centrifugal force of the cam member 42 will hold it against the cam member 41.

Alternatively, the cam member 42 may be described as a pusher actuated by centrifugal force to rotate the cam member 41 to which the eccentric bearing is fixed, such rotation being resisted by the springs and by the friction developed by the connecting rod structure against the eccentric bearing to resist its turning.

As the speed of the motor decreases, the centrifugal force acting on the cams 41 and 42 will be correspondingly lessened, and both cams will tend to move in a counterclockwise direction. If, owing to the friction exerted on the cam 41 and hereinbefore referred to, this cam tends to lag behind cam 42, the springs 47 will tend to maintain the cams in contact. Obviously the cooperating cam surfaces will tend to prevent more rapid return of the cam 41 than of the cam 42 to the position of Figure 1 only in the event the masses of these cams are unbalanced or the strength of the springs 47 is unequal so that the cam 41 tends to return to the low speed position before such position is reached by cam 42.

The invention illustrated is designed to serve as the power plant for an aeroplane and, as 1400 R. P. M. is necessary to sustain flight, this figure is selected as the speed at which centrifugal force will overcome the spring force to allow shifting of the bearing 40 away from idling position. Through varying the initial spring compression, various speeds can be selected for shifting the bearing position. It will be seen that the compression ratio will be highest and the air volumes drawn into the cylinders will be uniformly maximum below the selected predetermined engine speed. Above the predetermined speed, the compression ratio and the air volumes drawn into the cylinder will vary inversely with the speed.

It will be seen that when idling or starting the engine, the compression ratio will be high and thereby cause maximum temperature within the cylinders. This maximum temperature materially assists combustion so that ease of starting results as well as insuring that the engine will not stall through non-firing when used as the power plant of an aeroplane during idling speeds. Furthermore, the compression ratio mechanism herein described will assist engine efficiency because when running under load, the lowest compression ratio results.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a radial internal combustion engine, a crank shaft, a master rod hub pivotally mounted on the crank shaft, an eccentric bearing intermediate the master rod hub and the crank shaft, and mechanism including cooperating cam members carried by the crank shaft and associated with the the eccentric bearing to position it angularly with respect to the crank shaft, said cam members being automatically turned with respect to the crank shaft by centrifugal force.

2. In a radial internal combustion engine, a crank shaft, a master rod hub encircling the crank shaft, an eccentric bearing between the hub and the crank shaft having an end flange, a plate pivotally mounted on the crank shaft, said end flange and said plate having cam surfaces adapted to engage, and parallel means tending to hold the cam surfaces in contact.

3. In a radial internal combustion engine, a crank shaft having a crank pin, a rod structure having a hub encircling the pin, an eccentric bearing intermediate the hub and the pin, cooperating cam members responsive to centrifugal force, one of said members being fixed to said bearing and the other member being carried by the crank shaft, and spring means tending to hold the members in contacting relation, said spring means exerting forces between the members urging the bearing in a relation on the crank shaft to position the hub in high compression ratio relation below a predetermined crank shaft speed.

4. In an internal combustion engine, a crank shaft having a pin, a connecting rod hub encircling the pin, an eccentric bearing sleeve intermediate the hub and the pin, and means including associated cam members actuated by centrifugal force for regulating the position of the sleeve angularly relative to the crank shaft.

5. In an internal combustion engine, a crank shaft having a pin, a piston rod hub encircling the pin, an eccentric bearing intermediate the pin and the hub, means including centrifugally actuated cam members for regulating the position of the eccentric bearing angularly relative to the crank shaft, one of said members being fixed to the bearing sleeve and the other of said members being pivotally mounted on the crank shaft, and spring means intermediate the members opposing movement thereof by centrifugal force.

6. In a radial internal combustion engine, a crank shaft having a pin, a master rod hub encircling the pin, an eccentric bearing sleeve intermediate the pin and the hub, a flange extending from the sleeve, a plate pivotally mounted upon the crank shaft, said plate and flange having cooperating cam faces, a pair of telescoping means between the ends of the plate and the ends of the flange, and a coil spring surrounding each of the telescoping means and exerting pressure against the adjacent ends of the plate and the flange, said springs being arranged to exert sufficient pressure between the plate and the flange to urge the bearing in a relation with the crank shaft to position the hub in a high compression ratio relation below a predetermined crank shaft speed.

7. In a radial internal combustion engine, a crank shaft having a pin, a master rod hub encircling the pin, an eccentric bearing intermediate the pin and the hub adjustable angularly relative to the crank shaft, an offset flange extending from the bearing, a plate pivotally carried by the crank shaft, said plate and flange having cooperating cam surfaces, pivoted telescoping means intermediate the ends of the plate and the flange on opposite sides of the crank shaft, and means cooperating with the telescoping means tending to hold the plate and the flange in a predetermined relation and stationary relative to the crank shaft below a predetermined engine speed.

8. In a radial internal combustion engine, a crank shaft having a pin, a master rod hub encircling the pin, an adjustable eccentric bearing sleeve intermediate the pin and the hub, an offset cam flange extending from the bearing and fixed thereto, a cam plate pivotally carried by the crank shaft, the cam portions of said plate and said flange being adapted to cooperate and the center of gravity of the plate being in a relation to balance the center of gravity of the flange in all positions of rotation relative to the crank shaft, said flange and said plate being rotatable relative to the crank shaft by centrifugal force, and pressure means intermediate the flange and the plate exerting force of sufficient magnitude to hold the same stationary relative to the crank shaft below a predetermined engine speed.

9. In a radial internal combustion engine, a crank shaft having a pin, a master rod hub engaging the pin, an adjustable eccentric bearing sleeve intermediate the pin and the hub, an offset flange extending from one end of the sleeve, an offset plate pivotally connected by the crank arm in a vertical plane with the flange, said plate and flange having cam faces adapted to cooperate and being rotatable relative to the crank shaft in the same direction by centrifugal force, parallel means intermediate the flange and the plate, and pressure means associated with said parallel means fixing the plate and the flange stationary relative to the crank shaft to place the sleeve in position causing the hub to rotate in high compression ratio relation when the crank shaft is rotating below a predetermined speed.

10. In a radial internal combustion engine, a crank shaft having a pin, a master rod hub encircling the pin, a bearing sleeve mounted eccentrically on the crank shaft pin, an offset cam flange extending from the sleeve, a cam plate pivotally carried by the crank shaft adapted to engage with the flange, said plate and flange being rotatable in the same direction relative to the crank shaft through centrifugal force to regulate the compression ratio inversely to the crank shaft speed above a predetermined engine speed, and resilient means opposing rotation of the flange and sleeve relative to the crank shaft by centrifugal force.

LIONEL M. WOOLSON.